United States Patent
Terui

(10) Patent No.: US 10,038,366 B2
(45) Date of Patent: Jul. 31, 2018

(54) MULTIPHASE POWER FACTOR IMPROVEMENT CIRCUIT

(71) Applicant: SANKEN ELECTRIC CO., LTD., Niiza-Shi, Saitama (JP)

(72) Inventor: Hiromitsu Terui, Tokyo (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days.

(21) Appl. No.: 15/647,615

(22) Filed: Jul. 12, 2017

(65) Prior Publication Data

US 2017/0310209 A1 Oct. 26, 2017

Related U.S. Application Data

(63) Continuation of application No. PCT/JP2015/070155, filed on Jul. 14, 2015.

(51) Int. Cl.
*H02M 1/42* (2007.01)
*H02M 7/23* (2006.01)
*H02M 7/219* (2006.01)

(52) U.S. Cl.
CPC .......... *H02M 1/4208* (2013.01); *H02M 7/23* (2013.01); *H02M 7/219* (2013.01)

(58) Field of Classification Search
CPC .... H02M 1/42; H02M 1/4208; H02M 1/4241; H02M 7/08; H02M 7/17; H02M 7/23; H02M 2007/217

See application file for complete search history.

(56) References Cited

U.S. PATENT DOCUMENTS

| 8,125,158 | B2 * | 2/2012 | Nishino | H02M 1/4208 315/247 |
| 2007/0195560 | A1 * | 8/2007 | Yasumura | G05F 1/70 363/21.01 |
| 2010/0244789 | A1 | 9/2010 | Osaka | |
| 2013/0301317 | A1 * | 11/2013 | Ishii | H02M 1/4225 363/44 |

(Continued)

FOREIGN PATENT DOCUMENTS

| JP | 2010-226888 A | 10/2010 |
| JP | 2013-192340 A | 9/2013 |

(Continued)

*Primary Examiner* — Matthew Nguyen
(74) *Attorney, Agent, or Firm* — Metrolexis Law Group, PLLC

(57) ABSTRACT

A rectification circuit rectifies an alternating current voltage of an alternating current power supply. A parallel converter comprises converters that correspond to phases and that are connected in parallel to an output terminal of the rectification circuit. Each converter comprising a reactor, a switching circuit that is connected in series to the reactor and a diode that is connected in series to the reactor. A smoothing capacitor is connected to an output terminal of the parallel converter. A control circuit generates pulse signals corresponding to phases based on an error voltage between an output voltage of the smoothing capacitor and a reference voltage and on an output voltage of the rectification circuit, and switches the switching circuits in the converters using the pulse signals. Current detection circuits are provided corresponding to the converters and that detect currents flowing through the switching circuits.

5 Claims, 5 Drawing Sheets

(56) References Cited

U.S. PATENT DOCUMENTS

2014/0368742 A1* 12/2014 Joo .................... H02M 1/4208
348/730

FOREIGN PATENT DOCUMENTS

| JP | 2014-068424 A | 4/2014 |
| JP | 2014-110711 A | 6/2014 |
| WO | 2012/101698 A1 | 8/2012 |

* cited by examiner

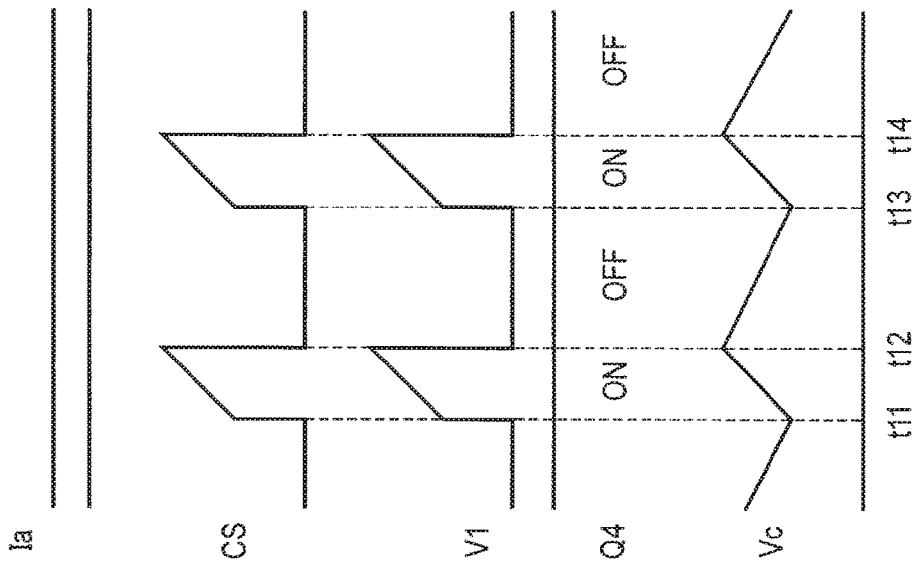
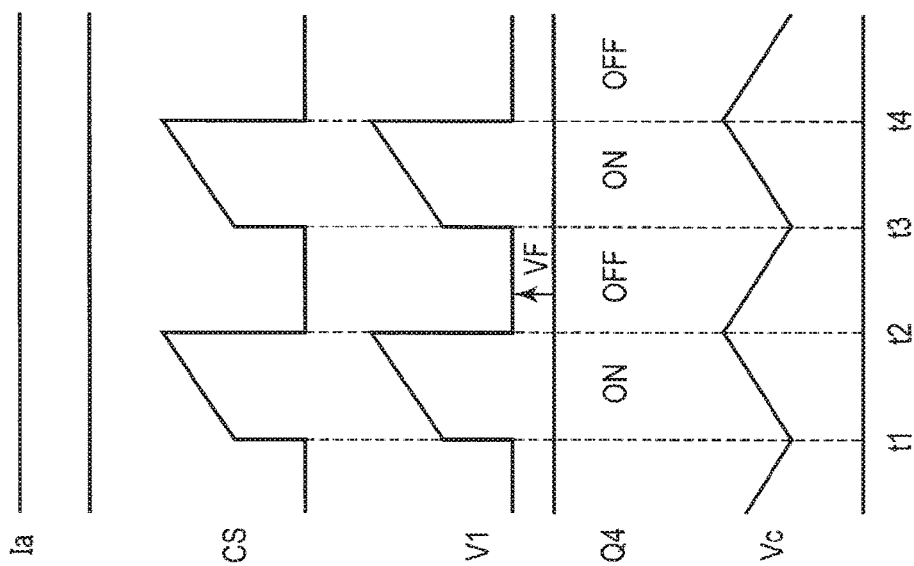

MULTIPHASE POWER FACTOR IMPROVEMENT CIRCUIT

CROSS REFERENCE TO RELATED APPLICATIONS

This application is a continuation application of International Application No. PCT/JP2015/070155, filed on Jul. 14, 2015, entitled "MULTIPHASE POWER FACTOR IMPROVEMENT CIRCUIT", the entire contents of which are incorporated herein by reference.

BACKGROUND

The disclosure relates to a multiphase power factor improvement circuit such as an interleaved converter.

Japanese Patent Application Publication No. 2013-192340 discloses a continuous conduction mode power factor correction (CCMPFC) circuit. This circuit detects an inputted current and performs power factor correction control based on the detected inputted current.

Japanese Patent Application Publication No. 2014-68424 discloses a CCMPFC circuit. This circuit detects a switch current flowing through a switch and performs overcurrent protection for the switch based on the switch current.

FIG. 6 illustrates a single-phase CCMPFC circuit. In this circuit, a ground current detected by current sensor S3 is equal to an inputted current (current flowing through reactor L1) necessary for CCMPFC control. Besides, while switching circuit Q1 is ON, the ground current is equal to the current of switching circuit Q1. For this reason, it is possible to perform both overcurrent protection and CCMPFC control for switching circuit Q1 with only single current sensor S3.

FIG. 7 illustrates a parallel converter including: a first converter made up of reactor L1, switching circuit Q1, and diode D1; and a second converter made up of reactor L2, switching circuit Q2, and diode D2, which are connected in parallel. This parallel converter is a multi-phased version of a PFC.

SUMMARY

One or more embodiments of a multiphase power factor improvement circuit include: a rectification circuit that rectifies an alternating current voltage of an alternating current power supply; a parallel converter comprising converters that correspond to phases and that are connected in parallel to an output terminal of the rectification circuit, each converter comprising a reactor; a switching circuit that is connected in series to the reactor; and a diode that is connected in series to the reactor; a smoothing capacitor that is connected to an output terminal of the parallel converter; a control circuit that generates pulse signals corresponding to phases based on an error voltage between an output voltage of the smoothing capacitor and a reference voltage and on an output voltage of the rectification circuit, and that switches the switching circuits in the converters using the pulse signals; and current detection circuits that are provided corresponding to the converters and that detect currents flowing through the switching circuits.

BRIEF DESCRIPTION OF DRAWINGS

FIGS. 4A and 4B are timing charts for explaining operations of the current reproduction circuit of the continuous conduction mode multiphase power factor improvement circuit;

DETAILED DESCRIPTION

Embodiments of a multiphase power factor improvement circuit are hereinafter described with reference to the drawings.

Embodiment 1

Figure 1:
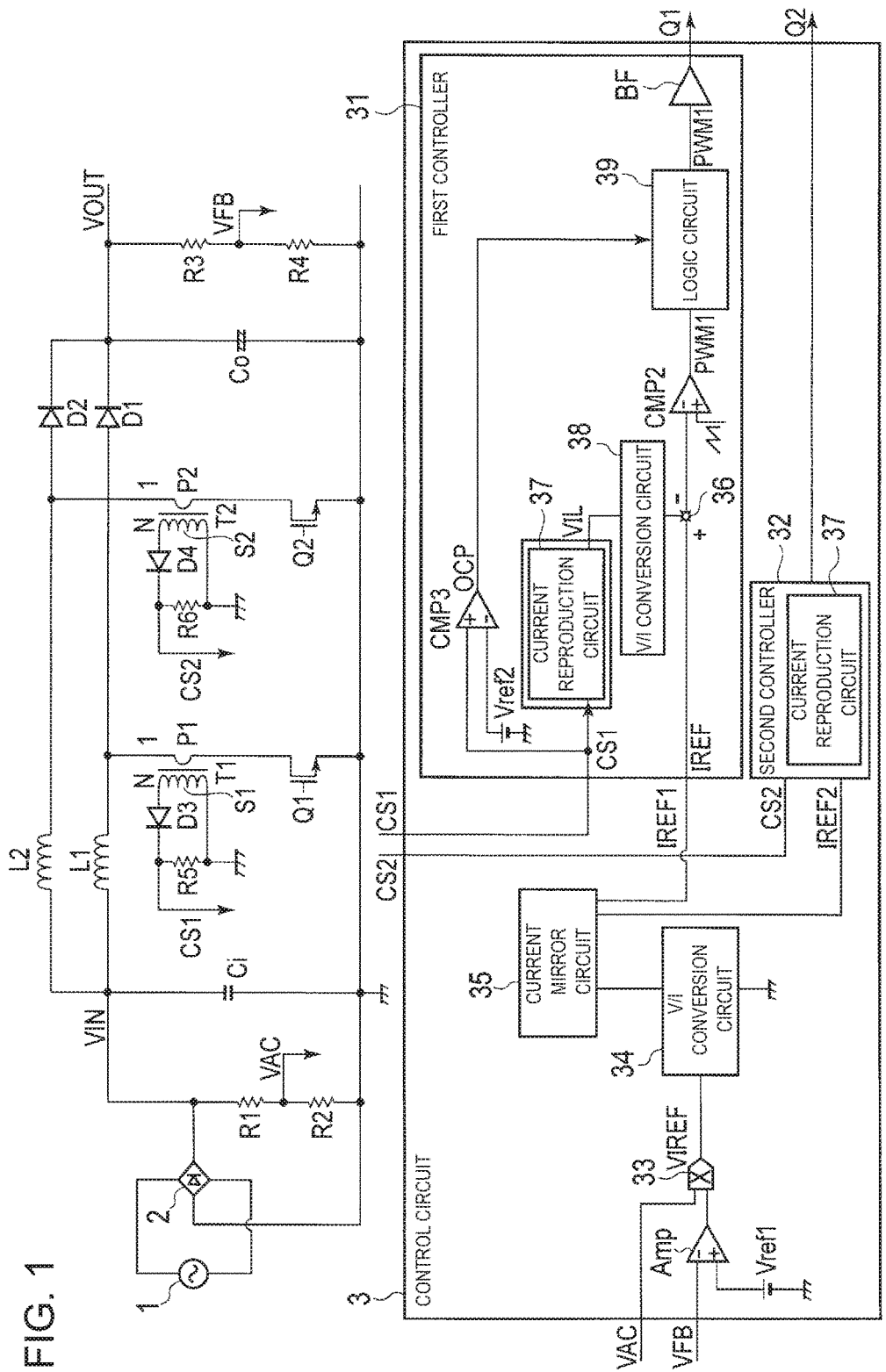
FIG. 1 is a circuit configuration diagram of a continuous conduction mode multiphase power factor improvement circuit according to one or more embodiments.

FIG. 1 is a circuit configuration diagram of a continuous conduction mode multiphase power factor improvement circuit according to one or more embodiments. As a continuous conduction mode multiphase power factor improvement circuit, FIG. 1 provides an explanation illustrating a continuous conduction mode two-phase power factor improvement circuit, that is, a continuous conduction mode interleaved power factor improvement circuit.

Note that the invention is applicable to a two- or higher-phase power factor improvement circuit of a three- or higher-phase in a continuous conduction mode, and is also applicable to a power factor improvement circuit in a discontinuous conduction mode or a critical conduction mode as the continuous conduction mode multiphase power factor improvement circuit.

The continuous conduction mode two-phase power factor improvement circuit is a power conversion apparatus, which reduces the current ripple and the current inputted to two converters by connecting the converters in parallel and shifting the phases of the converters relative to each other.

In FIG. 1, full-wave rectifier 2 may correspond to a rectification circuit. Full-wave rectifier 2 inputs an alternating current voltage from alternating current power supply 1, full-wave-rectifies the inputted alternating current voltage, and outputs the rectified voltage to capacitor Ci.

Capacitor Ci is connected in parallel to an output end of full-wave rectifier 2, and a first series circuit made up of step-up reactor L1, primary coil P1 of transformer T1, and switching circuit Q1 including a MOSFET is connected to the output end of full-wave rectifier 2. An anode of diode D1 is connected at a connection point of step-up reactor L1 and primary coil P1 of transformer T1, while a cathode of diode D1 is connected to the ground via smoothing capacitor Co.

A second series circuit made up of reactor L2, primary coil P2 of transformer T2, and switching circuit Q2 including a MOSFET is connected to the output end of full-wave rectifier 2. An anode of diode D2 is connected at a connection point of step-up reactor L2 and primary coil P2 of transformer T2, while a cathode of diode D2 is connected to the ground via smoothing capacitor Co.

A first converter includes step-up reactor L1, switching circuit Q1, and diode D1. A second converter includes step-up reactor L2, switching circuit Q2, and diode D2. A parallel converter includes the first converter and the second converter, and the input ends of these first converter and second converter are connected to each other, and so are the output ends.

As a dividing resistor, a series circuit of resistor R1 and resistor R2 is connected to the output end of full-wave rectifier 2. As a dividing resistor, a series circuit of resistor R3 and resistor R4 is connected to both ends of smoothing capacitor Co.

Control circuit 3 inputs input voltage VAC based on a dividing ratio between resistor R1 and resistor R2, and feedback voltage VFB based on a dividing ratio between resistor R3 and resistor R4. Control circuit 3 generates a drive signal based on input voltage VAC and feedback voltage VFB, and outputs the drive signal to gates of switching circuits Q1, Q2 including MOSFETs. The dividing ratios for obtaining input voltage VAC and feedback voltage VFB are preferably set equal to each other.

Transformer T1 includes primary coil P1 and secondary coil S1. A turns ratio of primary coil P1 to secondary coil S1 is 1:N. A series circuit of diode D3 and resistor R5 is connected to both ends of primary coil P1. Voltage CS1 at a connection point of diode D3 and resistor R5 is inputted to first controller 31 of control circuit 3. The first current detector includes transformer T1, diode D3, and resistor R5. The first current detector detects a current through switching circuit Q1 and outputs voltage CS1 proportional to the detected current.

Transformer T2 includes primary coil P2 and secondary coil S2. A turns ratio of primary coil P2 to secondary coil S2 is 1:N. A series circuit of diode D4 and resistor R6 is connected to both ends of primary coil P2. Voltage CS2 at a connection point of diode D4 and resistor R6 is inputted to second controller 32 of control circuit 3. The second current detector includes transformer T2, diode D4, and resistor R6. The second current detector detects a current through switching circuit Q2 and outputs voltage CS2 proportional to the detected current. The first current detector and the second current detector may correspond to current detectors.

Control circuit 3 includes error amplifier Amp, first controller 31, second controller 32, arithmetic unit 33, V/I conversion circuit 34, and current mirror circuit 35.

Error amplifier Amp amplifies an error between feedback voltage VFB and reference voltage Vref1 to output an error amplification signal. Arithmetic unit 33 calculates input voltage VAC and error amplification signal from error amplifier Amp, and outputs target values of currents flowing through switching circuits Q, Q2 to V/I conversion circuit 34.

V/I conversion circuit 34 converts voltages based on the current target values from arithmetic unit 33 to currents IREF1, IREF2. Current mirror circuit 35 outputs current IREF1 to first controller 31 and outputs current IREF2 to second controller 32, the currents having been converted by V/I conversion circuit 34.

First controller 31 includes adder 36, comparator CMP3, current reproduction circuit 37, V/I conversion circuit 38, comparator CMP2, logic circuit 39, and buffer BF. Note that since second controller 32 may have the same configuration as that of first controller 31, details of the configurations of the elements are described only for first controller 31 here.

Current reproduction circuit 37 reproduces a current flowing through reactor L1 based on voltage CS1 obtained by rectifying a voltage generated in secondary coil S1 of transformer T1 and on current Ia proportional to a voltage difference between input voltage VAC and feedback voltage VFB. Current reproduction circuit 37 outputs voltage VIL corresponding to the reproduced voltage to V/I conversion circuit 38. Note that detailed circuit configuration of current reproduction circuit 37 is described later.

V/I conversion circuit 38 converts voltage VIL to current I. Adder 36 performs subtraction on current IREF1 from current mirror circuit 35 and current I converted by V/I conversion circuit 38, and outputs the obtained current to an inverting input terminal of comparator CMP2.

Comparator CMP2 compares the current from adder 36 and a triangle wave signal to generate pulse signal PWM1, and outputs pulse signal PWM1 to logic circuit 39. Second controller 32 generates pulse signal PWM2. Here, an ON-OFF duty cycle of pulse signal PWM2 is the same as an ON-OFF duty cycle of pulse row signal PWM1, and phases of pulse signal PWM2 and pulse signal PWM1 are shifted by 180°, that is, by half a period.

Comparator CMP3 compares voltage CS1 and reference voltage Vref2. If voltage CS1 is less than reference voltage Vref2, comparator CMP3 outputs a L voltage to logic circuit 39, and if voltage CS1 reaches reference voltage Vref2 or higher, comparator CMP3 outputs a H voltage, that is, an overcurrent protection signal to logic circuit 39.

If a L voltage is inputted from comparator CMP3, logic circuit 39 outputs pulse signal PWM1 from comparator CMP2 to buffer BF. Buffer BF turns switching circuit Q1 ON and OFF by applying pulse signal PWM1 from comparator CMP2 to the gate of switching circuit Q1.

If a H voltage is inputted from comparator CMP3, logic circuit 39 does not output pulse signal PWM1 from comparator CMP2 to buffer BF. In other words, it is possible to perform overcurrent protection for switching circuit Q1 by turning switching circuit Q1 OFF.

Figure 2:
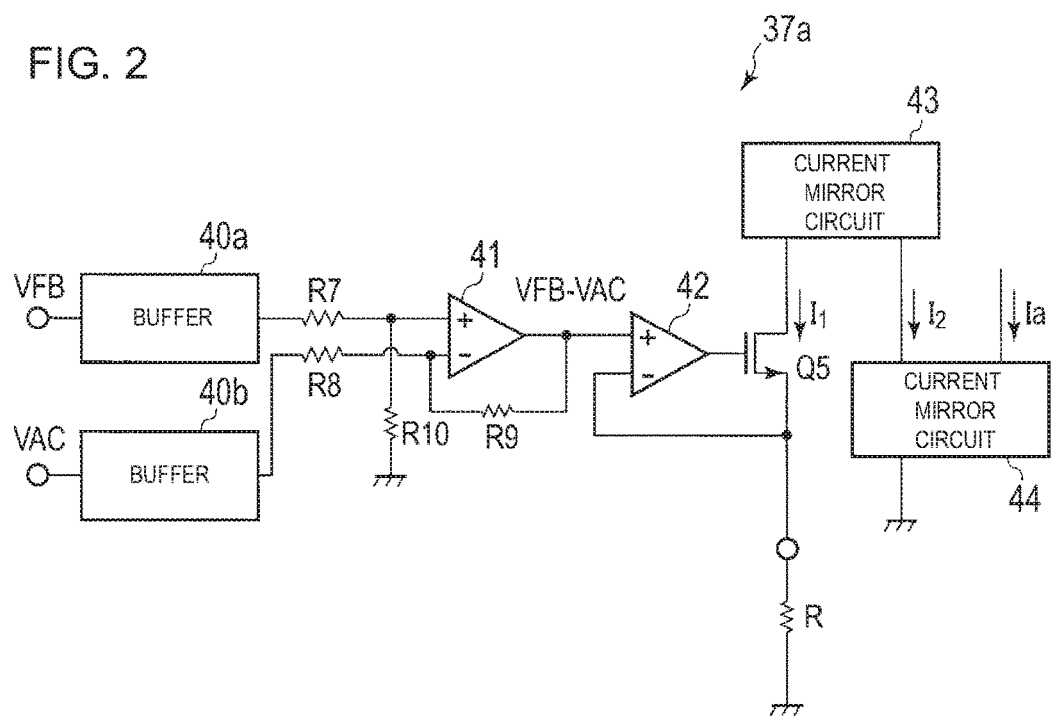
FIG. 2 is a diagram illustrating a configuration of a first current reproduction circuit inside a current reproduction circuit provided in a controller of the continuous conduction mode multiphase power factor improvement circuit.
Figure 3:
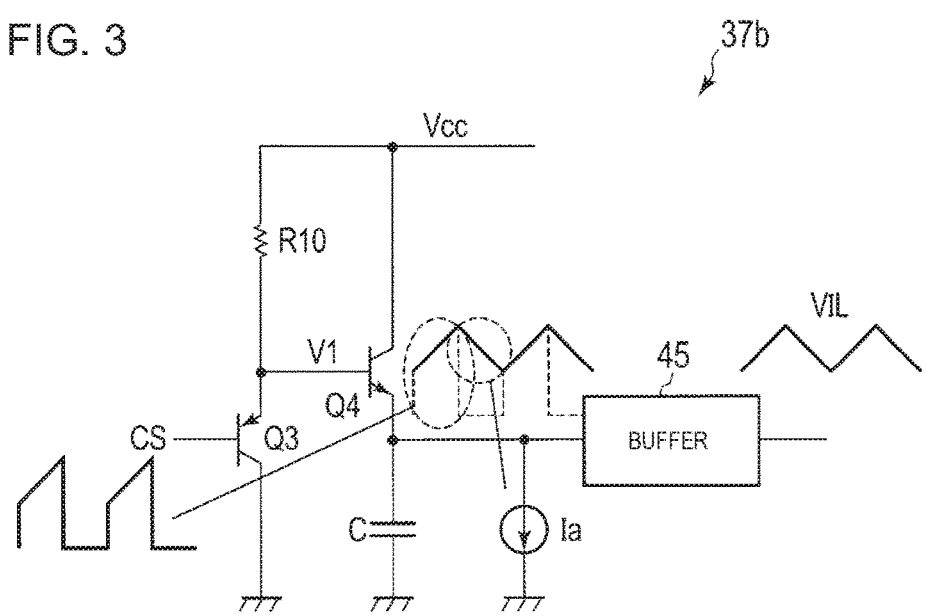
FIG. 3 is a diagram illustrating a configuration of a second current reproduction circuit inside the current reproduction circuit provided in a controller of the continuous conduction mode multiphase power factor improvement circuit.

Next, a detailed circuit configuration of current reproduction circuit 37 is illustrated in FIG. 2 and FIG. 3. Current reproduction circuit 37 includes first current reproduction circuit 37a illustrated in FIG. 2 and second current reproduction circuit 37b illustrated in FIG. 3. First current reproduction circuit 37a generates current Ia proportional to the voltage difference between input voltage VAC and feedback voltage VFB, and includes buffers 40a, 40b, resistors R7 to R9, operational amplifiers 41, 42, MOSFET Q5, and current mirror circuits 43, 44.

Buffer 40a outputs feedback voltage VFB to a non-inverting terminal of operational amplifier 41 via resistor R7. Buffer 40b outputs input voltage VAC to an inverting terminal of operational amplifier 41 via resistor R8.

One end of resistor R7 and one end of resistor R10 are connected to the non-inverting terminal of operational amplifier 41, and the other terminal of resistor R10 is connected to the ground. One end of resistor R8 and one end of resistor R9 are connected to the inverting terminal of operational amplifier 41, and the other terminal of resistor R9 is connected to an output terminal of operational amplifier 41. Operational amplifier 41 outputs the voltage difference between feedback voltage VFB and input voltage VAC.

The other end of resistor R9 and the output terminal of operational amplifier 41 are connected to a non-inverting terminal of operational amplifier 42, and a source of MOSFET Q5 and one end of resistor R are connected to an inverting terminal of operational amplifier 42. The other end of resistor R is connected to the ground.

A gate of MOSFET Q5 is connected to the output terminal of operational amplifier 42, and a drain of MOSFET Q5 is connected to current mirror circuit 43. Operational amplifier 42 and MOSFET Q5 convert the voltage difference from operational amplifier 41 between feedback voltage VFB and input voltage VAC to current $I_1$ corresponding to the voltage difference between feedback voltage VFB and input voltage VAC, and cause converted current $I_1$ to flow through MOSFET Q5 and resistor R.

Current mirror circuit 43 causes current $I_1$ to flow through MOSFET Q5 and resistor R, and thereby causes current $I_2$, proportional to current $I_1$, to flow through current mirror circuit 44. Current mirror circuit 44 causes current Ia, proportional to current $I_2$ from current mirror circuit 43, to flow. For this reason, current Ia is a current which is proportional to the voltage difference between feedback voltage VFB and input voltage VAC. Also, current Ia is a current dependent on gradients of the currents flowing through reactors L1, L2 while switching circuits Q1, Q2 are turned OFF. Current Ia is a current that flows through current source Ia provided in second current reproduction circuit 37b.

Next, a configuration of second current reproduction circuit 37b is described. Second current reproduction circuit 37b includes PNP bipolar transistor Q3, resistor R10, NPN bipolar transistor Q4, capacitor C, and current source Ia.

One end of resistor R10 is connected to power supply Vcc, and the other end of resistor R10 is connected to an emitter of bipolar transistor Q3. Voltage CS is applied to a base of bipolar transistor Q3 being a control electrode, and a collector of bipolar transistor Q3 is connected to the ground. A collector of bipolar transistor Q4 is connected to power supply Vcc. In other words, bipolar transistors Q3, Q4 are configured as an emitter follower.

A base of bipolar transistor Q4 being a control electrode is connected to the emitter of bipolar transistor Q3 and the other end of resistor R10. An emitter of bipolar transistor Q4 is connected to one end of capacitor C, one end of current source Ia, and an input terminal of buffer 45. The other end of capacitor C and the other end of current source Ia are connected to the ground.

Next, description is provided for operations of second current reproduction circuit 37b having such a configuration with reference to FIG. 3 and FIGS. 4A and 4B. FIGS. 4A and 4B are timing charts for explaining operations of current reproduction circuit 37 of the continuous conduction mode multiphase power factor improvement circuit of Embodiment 1. FIG. 4A illustrates the case where current Ia is relatively large, and FIG. 4B illustrates the case where current Ia is relatively small.

In FIGS. 4A and 4B, CS represents voltage CS to be inputted to the base of bipolar transistor Q3, an V1 is a base voltage of bipolar transistor Q4. Q4 is bipolar transistor Q4, and Vc is a voltage of capacitor C.

Here, operations when switching circuit Q1 is turned ON and OFF are described. An ON-OFF operation of switching circuit Q2 is performed while being shifted by half a period relative to an ON-OFF operation of switching circuit Q1.

To begin with, when switching circuit Q1 is turned ON, voltage CS, which is obtained by converting the switch current of switching circuit Q1 detected at transformer T1, increases linearly during the time interval from t1 to t2 illustrated in FIG. 4A, and is applied to the base of transistor Q3. Base voltage V1 increases accordingly, and transistor Q4 is turned ON. At this moment, base voltage V1 of transistor Q4 is higher than voltage CS by forward voltage VF between the emitter and the base of transistor Q3. Thus, voltage Vc of capacitor C is the same as voltage CS because voltage Vc is lower than base voltage V1 by forward voltage VF between the base and the emitter of transistor Q4.

During the time interval from t1 to t2, since power is supplied from power supply Vcc to capacitor C via resistor R10 and bipolar transistor Q4, capacitor C is charged and voltage Vc increases linearly. Voltage Vc is sent as voltage VIL to V/I conversion circuit 38 via buffer 45.

Next, when switching circuit Q1 is turned OFF during the time interval from t2 to t3, voltage CS becomes zero. If voltage CS is zero, transistor Q4 is turned OFF because the voltage obtained by subtracting voltage Vc from voltage V1 is smaller than forward voltage VF. Thus, capacitor C discharges since current source Ia drains electric charge, and voltage Vc of capacitor C decreases as a result. Here, voltage Vc of capacitor C has a voltage waveform with gradient Ia/C.

Since current Ia is large In FIG. 4A, the gradient of voltage Vc while switching circuit Q1 is turned OFF is relatively large. Conversely, since current Ia is small in FIG. 4B, the gradient of voltage Vc while switching circuit Q1 is turned OFF is relatively small.

Gradient Ia/C corresponds to the current of reactor L1. The reason for this is explained below.

For input voltage VIN and output voltage VOUT illustrated in FIG. 1, the gradient of the current of reactor L1 while switching circuit Q1 is turned OFF is expressed by Equation (1):

$$dI_L/dT_{OFF}=(VOUT-VIN)/L \quad (1),$$

where $I_L$ is the current flowing through reactor L1.

In the case of the current detector of Embodiment 1, the current while switching circuit Q1 is turned ON is expressed by Equation (2):

$$CS=R5 \cdot I_L/N \quad (2),$$

where N is the ratio of primary coil P1 to secondary coil S1.

The voltage gradient of capacitor C is expressed by Equation (3):

$$Ia/C=dVc/dt=R5(VOUT-VIN)/N \cdot L \quad (3),$$

where L is an inductance value of reactor L1.

Equation (4) is obtained with reference to FIG. 1 and FIG. 2:

$$Ia=(R1+R2)(VOUT-VIN)/(R2 \cdot R) \quad (4).$$

Referring to Equation (3) and Equation (4), resistor R of first current reproduction circuit 37a is set to a value expressed by Equation (5):

$$R=(R2 \cdot N \cdot L)/\{(R1+R2) \cdot R5 \cdot C\} \quad (5).$$

This makes it possible to reproduce in capacitor C a signal corresponding to the current flowing through reactor L1. This thus means that the current of switching circuit Q1 is detected by the first current detector and the current flowing through reactor L1 is detected thanks to voltage Vc corresponding to the detected current. This also means that the current of switching circuit Q2 is detected by the second current detector and the current flowing through reactor L2 is detected thanks to voltage Vc corresponding to the detected current. Here, since the dividing ratios for obtaining input voltage VAC and feedback voltage VFB are equal to each other, the currents flowing through the reactors can be obtained accurately using the equations written above.

In other words, for each current detector, when the current detector detects the current flowing through the switching circuit, control circuit 3 improves the power factor based on the current detected by that current detector and protects switching circuit Q1 or Q2. Hence, it is possible to perform protection and CCMPFC control of switching circuits Q1, Q2 by detecting a current at one location in each phase.

Figure 7:
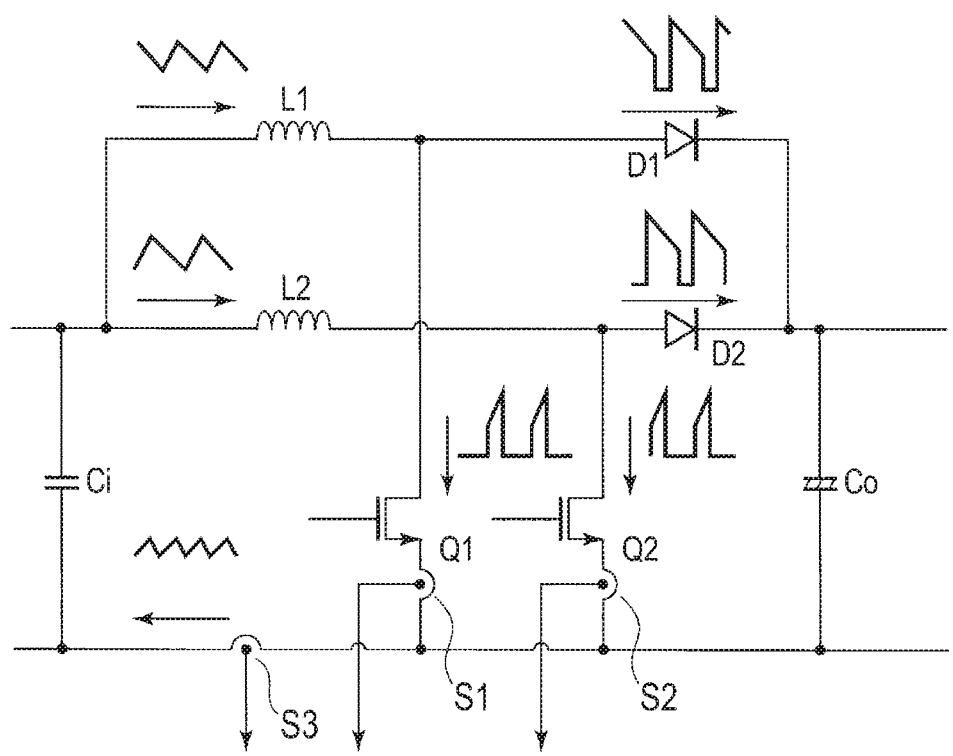
FIG. 7 is a circuit configuration diagram of a continuous conduction mode multiphase power factor improvement circuit according to related art.

Additionally, it is possible to perform protection and CCMPFC control of switching circuits Q1, Q2 with two current detectors, which can reduce the number of current detectors by one compared to the conventional configuration illustrated in FIG. 7.

Embodiment 2

Figure 5:
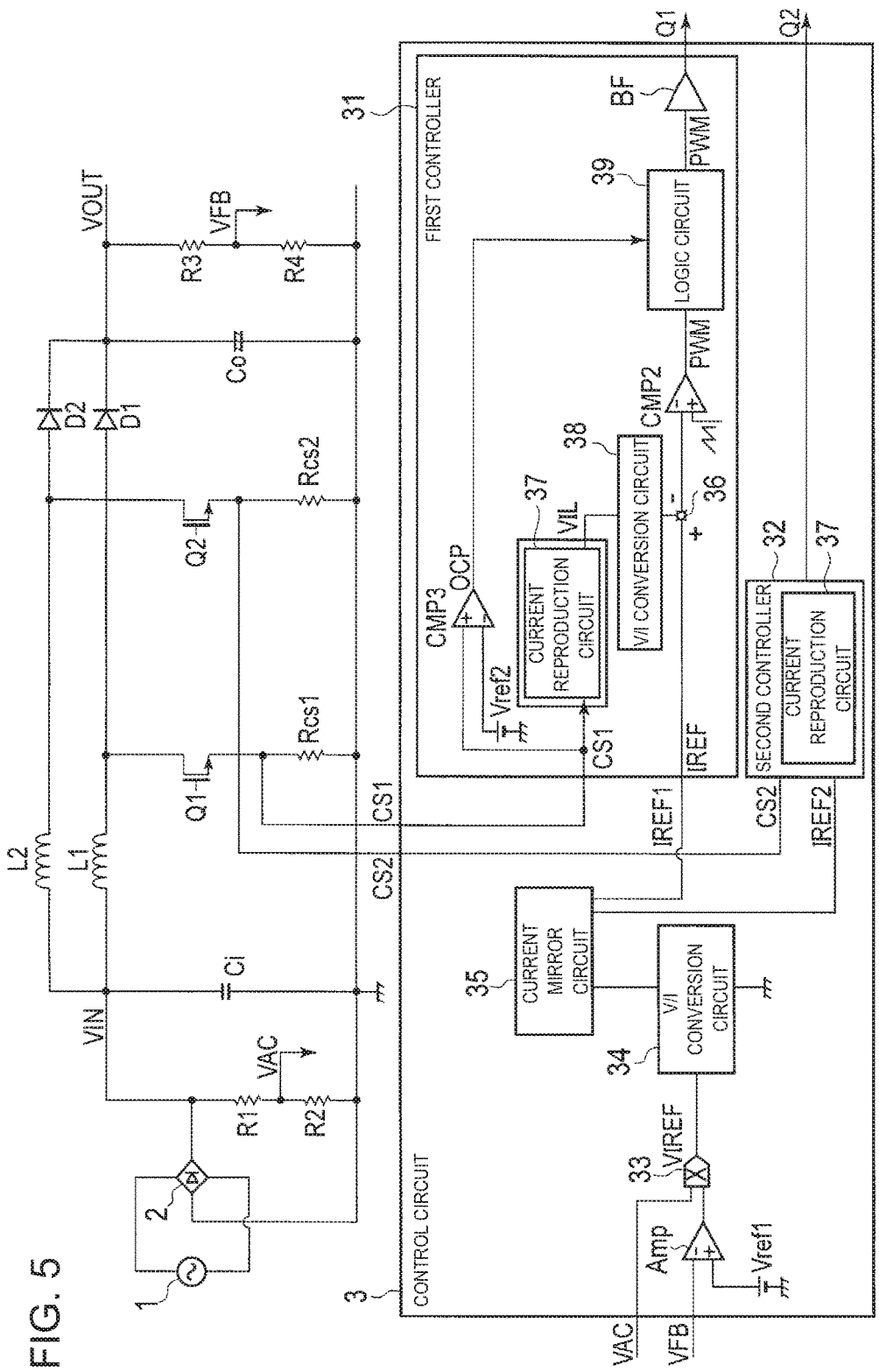
FIG. 5 is a circuit configuration diagram of one or more continuous conduction mode multiphase power factor improvement circuits.
Figure 6:
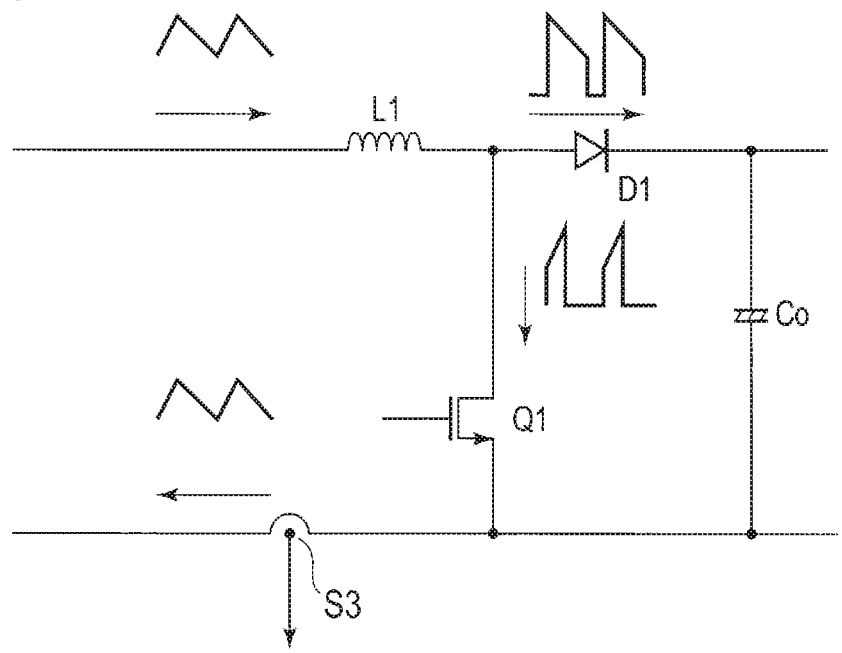
FIG. 6 is a circuit configuration diagram of a continuous conduction mode single-phase power factor improvement circuit according to related art.

FIG. 5 is a circuit configuration diagram of a continuous conduction mode multiphase power factor improvement circuit representing one or more embodiments. FIG. 5 connects resistor Rcs1 (Rcs2) to the source of switching circuit Q1 (Q2) in place of transformers T1, T2, diodes D3, D4, and resistors R5, R6 of Embodiment 1 illustrated in FIG. 1.

Resistors Rcs1, Rcs2 may correspond to current detectors. Resistor Rcs1 detects the current flowing through switching circuit Q1 and outputs the voltage, voltage CS1, which corresponds to the detected current to first controller 31. Resistor Rcs2 detects the current flowing through switching circuit Q2 and outputs the voltage, voltage CS2, which corresponds to the detected current to second controller 32.

Since the operations of first controller 31 and second controller 32 illustrated in FIG. 5 may be the same as those of first controller 31 and second controller 32 illustrated in FIG. 1, their description is omitted.

The continuous conduction mode multiphase power factor improvement circuit of Embodiment 2 as described above also has the same effects as those of the continuous conduction mode multiphase power factor improvement circuit of Embodiment 1. Besides, since resistors Rcs1, Rcs2 are used, it is possible to simplify the circuit.

Since the power factor improvement circuit in the discontinuous conduction mode or the critical conduction mode can remove the current detector conventionally provided, it is possible to obtain the same effects as those of the continuous conduction mode multiphase power factor improvement circuit of Embodiment 1.

One or more embodiments described above are applicable to an interleaved power factor improvement circuit.

In the circuit of the above-described related art, a multi-phased PFC circuit has a ground current that is equal to the inputted current, but is different from both the current of switching circuit Q1 and the current of switching circuit Q2. For this reason, current sensors S1, S2 are used to detect the current in each phase for the purpose of overcurrent protection of switching circuit Q1 and switching circuit Q2, and current sensor S3 is used to detect a current for the purpose of CCMPFC control. Thus, three current sensors S1 to S3 are necessary. In addition, also in a discontinuous conduction mode power factor improvement circuit (DCMPFC) or a critical conduction mode power factor improvement circuit (CRMPFC), it is sometimes necessary to detect the inputted current for the purpose of PFC control. Due to this, the multiphase power factor improvement circuit has a problem of complex configuration and expensive costs.

According to one or more embodiments described above, since the control circuit improves the power factor based on the currents flowing through the switching circuits and protects the switching circuits, it is possible to reduce the number of current detectors and to perform protection and PFC control of the switching circuits with a simple configuration.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A multiphase power factor improvement circuit, comprising:
 a rectification circuit that rectifies an alternating current voltage of an alternating current power supply;
 a parallel converter comprising converters that correspond to phases and that are connected in parallel to an output terminal of the rectification circuit, each converter comprising:
  a reactor;
  a switching circuit that is connected in series to the reactor; and
  a diode that is connected in series to the reactor;
 a smoothing capacitor that is connected to an output terminal of the parallel converter;
 a control circuit that generates pulse signals corresponding to phases based on an error voltage between an output voltage of the smoothing capacitor and a reference voltage and on an output voltage of the rectification circuit, and that switches the switching circuit in the respective converters using the pulse signals; and
 current detection circuits that are provided corresponding to the converters and that detect currents flowing through the switching circuits;
 wherein
 the control circuit comprises current reproduction circuits that are provided corresponding to the converters and that reproduce currents flowing through the reactor of the respective converters based on voltages corresponding to currents detected by the current detection circuits and on a current corresponding to a difference between the output voltage of the smoothing capacitor and the output voltage of the rectification circuit.

2. The multiphase power factor improvement circuit according to claim 1, further comprising:
 a first dividing resistance circuit that is connected to the output voltage of the smoothing capacitor, and
 a second dividing resistance circuit that is connected to the output voltage of the rectification circuit.

3. The multiphase power factor improvement circuit according to claim 2, wherein
 dividing ratios of the first and second dividing resistance circuits are equal to each other.

4. The multiphase power factor improvement circuit according to claim 1, wherein
 each of the current reproduction circuits comprises:
  a current source that causes a current to flow, the current corresponding to the difference between the output voltage of the smoothing capacitor and the output voltage of the rectification circuit;
  a first transistor that is switched by a voltage being applied to a first control electrode of the first transistor, the voltage corresponding to a current detected by each of the current detection circuits;
  a second transistor that includes a second control electrode connected to an output electrode of the first transistor, and that is turned OFF when the first transistor is turned ON, and is turned ON when the first transistor is turned OFF; and a capacitor that includes one end connected to an output electrode of the second transistor, and both ends connected to the current source.

5. The multiphase power factor improvement circuit according to claim 1, wherein the control circuit further comprises a V/I conversion circuit that converts an output voltage of each of the current reproduction circuits to a predetermined current;

an addition circuit that performs subtraction on a first reference current and a current outputted by the V/I conversion circuit, and outputs an obtained current;

a first comparator that compares the current from the addition circuit and a triangle wave signal to generate a first pulse signal;

a second comparator that compares a voltage corresponding to currents detected by the current detection circuits and a first reference voltage to generate a second pulse signal; and a logic circuit that outputs the first pulse signal of the first comparator based on an output of the second pulse signal generated from the second comparator, wherein the switching circuit performs switching operation based on the first pulse signal.

* * * * *